United States Patent
Aoki et al.

(10) Patent No.: US 8,894,193 B2
(45) Date of Patent: Nov. 25, 2014

(54) DECOLORIZABLE WATER-BASED INKJET INK

(75) Inventors: Takayasu Aoki, Shizuoka-ken (JP);
Takafumi Hara, Shizuoka-ken (JP);
Tsuyoshi Itou, Shizuoka-ken (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 712 days.

(21) Appl. No.: 13/090,413

(22) Filed: Apr. 20, 2011

(65) Prior Publication Data

US 2011/0261108 A1    Oct. 27, 2011

Related U.S. Application Data

(60) Provisional application No. 61/328,380, filed on Apr. 27, 2010, provisional application No. 61/447,291, filed on Feb. 28, 2011.

(51) Int. Cl.
*C09D 11/00* (2014.01)
*C09D 11/38* (2014.01)
*C09D 11/328* (2014.01)

(52) U.S. Cl.
CPC .............. *C09D 11/38* (2013.01); *C09D 11/328* (2013.01)
USPC ............................................... 347/100

(58) Field of Classification Search
CPC .. G03G 9/0928; G03G 9/0806; G03G 9/0926
USPC ............................................... 347/100
See application file for complete search history.

(56) References Cited

U.S. PATENT DOCUMENTS

| | | | |
|---|---|---|---|
| 2003/0089270 A1* | 5/2003 | Shen et al. | 106/31.2 |
| 2007/0051273 A1* | 3/2007 | Hiroki et al. | 106/31.86 |
| 2008/0286678 A1* | 11/2008 | Aoki et al. | 430/109.3 |
| 2010/0021840 A1 | 1/2010 | Sano et al. | |
| 2010/0209839 A1 | 8/2010 | Kabai et al. | |

FOREIGN PATENT DOCUMENTS

| | | |
|---|---|---|
| CN | 1246658 | 3/2000 |
| CN | 101412865 | 4/2009 |
| JP | 04-198282 | 7/1992 |
| JP | 2000053905 | 2/2000 |
| JP | 3457538 | 8/2003 |
| JP | 2008-247935 | 10/2008 |
| JP | 2009-120670 | 6/2009 |
| JP | 2009-192943 | 8/2009 |

OTHER PUBLICATIONS

Chinese Office Action for Chinese Application No. 201110106184.6 mailed on May 6, 2013.
First Office Action for Japanese Patent Application No. 2011-098055 Dated Apr. 22, 2014, 5 pgs.

* cited by examiner

*Primary Examiner* — Laura Martin
(74) *Attorney, Agent, or Firm* — Amin, Turocy & Watson, LLP

(57) ABSTRACT

According to one embodiment, a decolorizable water-based inkjet ink includes a color material, a solvent, and a nonionic surfactant. The color material contains a color developable compound and a color developing agent, and the solvent contains water and a water-soluble organic solvent. The nonionic surfactant is contained in the ink in an amount of 5 wt % or more of the total amount of the solvent.

13 Claims, 1 Drawing Sheet

DECOLORIZABLE WATER-BASED INKJET INK

CROSS-REFERENCE TO RELATED APPLICATIONS

This application is based upon and claims the benefit of priority from U.S. Provisional Application No. 61/328,380 filed on Apr. 27, 2010; and U.S. Provisional Application No. 61/447,291 filed on Feb. 28, 2011, the entire contents of which are incorporated herein by reference.

FIELD

Embodiments described herein relate generally to a decolorizable water-based inkjet ink.

BACKGROUND

A decolorizable ink in which a leuco dye and a color developing agent are dissolved in an organic solvent is being developed as an ink for inkjet recording. An image formed on a paper medium using such a decolorizable ink can be erased (decolorized) by heating. However, when an oil-based ink containing an organic solvent is used, there is a possibility that by applying the ink again to the paper medium after decolorization, the decolorized ink may develop the color again.

From the viewpoint of reduction in volatile organic compounds (VOC), it is desired to use a water-based ink containing a water-based solvent such as water, however, such a water-based ink is liable to cause curling of a paper medium. When a coverage is increased, curling of a paper medium is particularly prominent. A water-based ink having a high water content is liable to dry, and when the ink is used for inkjet recording, clogging of inkjet heads is liable to occur.

A decolorizable water-based inkjet ink which dries at an adequate rate and can form an image on a paper medium without causing curling is not obtained yet.

DETAILED DESCRIPTION

Figure 1:
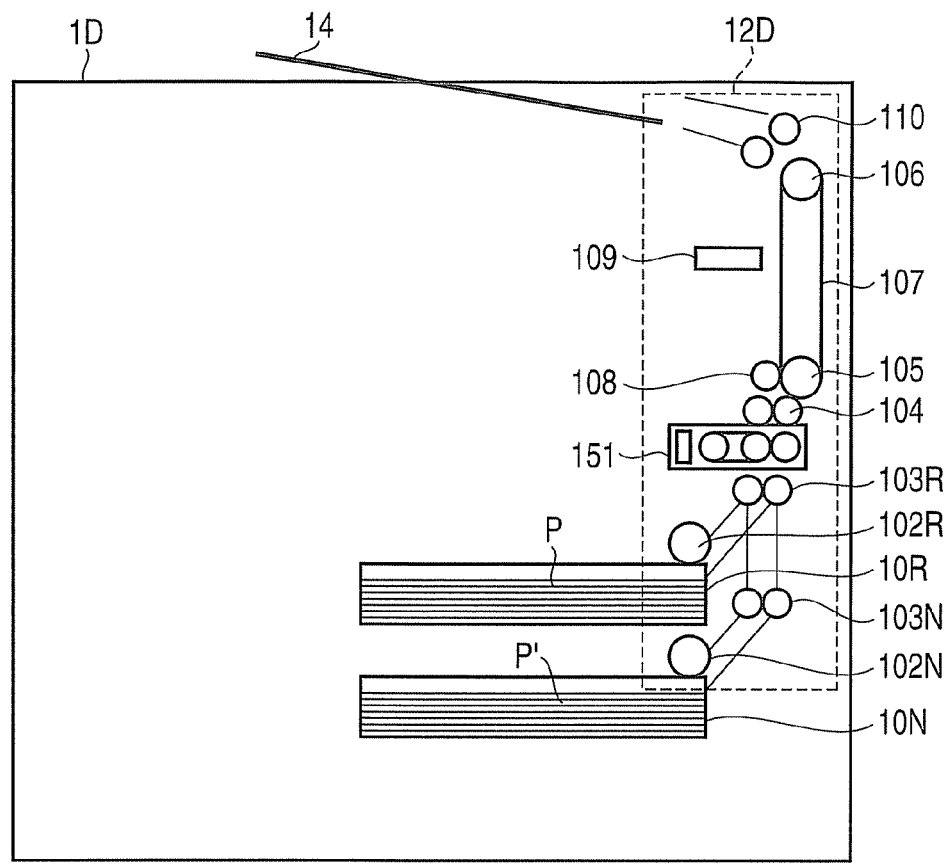
FIG. 1 is a schematic view showing an exemplary inkjet recording apparatus.

In general, according to one embodiment, a decolorizable water-based inkjet ink includes a color material, a solvent, and a nonionic surfactant. The color material contains a color developable compound and a color developing agent, and the solvent contains water and a water-soluble organic solvent. The nonionic surfactant is contained in the ink in an amount of 5 wt % or more of the total amount of the solvent.

Hereinafter, embodiments will be specifically described.

The color material contained in the decolorizable water-based inkjet ink according to this embodiment includes a color developable compound and a color developing agent.

Examples of the color developable compound include leuco dyes, and specific examples thereof include diphenylmethane phthalides, phenylindolyl phthalides, indolyl phthalides, diphenylmethane azaphthalides, phenylindolyl azaphthalides, fluorans, styrynoquinolines, and diaza-rhodamine lactones.

More specific examples of the color developable compound include the following compounds: crystal violet lactone (CVL), 3,3-bis(p-dimethylaminophenyl)-6-dimethylaminophthalide, 3-(4-diethylaminophenyl)-3-(1-ethyl-2-methylindol-3-yl) phthalide, 3,3-bis(1-n-butyl-2-methylindol-3-yl)phthalide, 3,3-bis(2-ethoxy-4-diethylaminophenyl)-4-azaphthalide, 3-(2-ethoxy-4-diethylaminophenyl)-3-(1-ethyl-2-methylindol-3-yl)-4-azaphthalide, 3-[2-ethoxy-4-(N-ethylanilino)phenyl]-3-(1-ethyl-2-methylindol-3-yl)-4-azaphthalide, 3,6-diphenylaminofluoran, 3,6-dimethoxyfluoran, 3,6-di-n-butoxyfluoran, 2-methyl-6-(N-ethyl-N-p-tolylamino)fluoran, 2-N,N-dibenzylamino-6-diethylaminofluoran, 3-chloro-6-cyclohexylaminofluoran, 2-methyl-6-cyclohexylaminofluoran, 2-(2-chloroanilino)-6-di-n-butylaminofluoran, 2-(3-trifluoromethylanilino)-6-diethylaminofluoran, 2-(N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1,2-benz-6-diethylaminofluoran, 1,2-benz-6-(N-ethyl-N-isobutylamino)fluoran, 1,2-benz-6-(N-ethyl-N-isoamylamino)fluoran, 2-(3-methoxy-4-dodecoxystyryl)quinoline, spiro[5H-(1)benzopyrano(2,3-d)pyrimidine-5,1'(3'H)isobenzofuran]-3'-one, 2-(diethylamino)-8-(diethylamino)-4-methyl-, spiro[5H-(1)benzopyrano(2,3-d)pyrimidine-5,1'(3'H)isobenzofuran]-3'-one, 2-(di-n-butylamino)-8-(di-n-butylamino)-4-methyl-, spiro[5H-(1)benzopyrano(2,3-d)pyrimidine-5,1'(3'H)isobenzofuran]-3'-one, 2-(di-n-butylamino)-8-(diethylamino)-4-methyl-, spiro[5H-(1)benzopyrano(2,3-d)pyrimidine-5,1'(3'H)isobenzofuran]-3'-one, 2-(di-n-butylamino)-8-(N-ethyl-N-1-amylamino)-4-methyl-, spiro[5H-(1)benzopyrano(2,3-d)pyrimidine-5,1'(3'H)isobenzofuran]-3'-one, 2-(di-n-butylamino)-8-(di-n-butylamino)-4-phenyl, 3-(2-methoxy-4-dimethylaminophenyl)-3-(1-butyl-2-methylindol-3-yl)-4,5,6,7-tetrachlorophthalide, 3-(2-ethoxy-4-diethylaminophenyl)-3-(1-ethyl-2-methylindol-3-yl)-4,5,6,7-tetrachlorophthalide, and 3-(2-ethoxy-4-diethylaminophenyl)-3-(1-pentyl-2-methylindol-3-yl)-4,5,6,7-tetrachlorophthalide.

Additional examples thereof include pyridine compounds, quinazoline compounds, and bisquinazoline compounds.

The color developable compounds described above can be used alone or in combination of two or more kinds thereof. The content of the color developable compound is preferably from 0.5 to 10.0 wt % of the total amount of the decolorizable water-based inkjet ink. The content of the color developable compound is more preferably from 0.5 to 5.0 wt % of the total amount of the decolorizable water-based inkjet ink.

Examples of the color developing agent include phenols, metal salts of phenols, metal salts of carboxylic acids, aromatic carboxylic acids, aliphatic carboxylic acids having 2 to 5 carbon atoms, sulfonic acids, sulfonates, phosphoric acids, metal salts of phosphoric acids, acidic phosphoric acid esters, metal salts of acidic phosphoric acid esters, phosphorous acids, metal salts of phosphorous acids, monophenols, polyphenols, 1,2,3-triazole, and derivatives thereof.

These compounds may have a substituent selected from the group consisting of an alkyl group, an aryl group, an acyl group, an alkoxycarbonyl group, a carboxy group or an ester thereof, an amide group, and a halogen group. Further, additional examples thereof include bisphenols, trisphenols, phenol-aldehyde condensed resins, and metal salts thereof. The color developing agents may be used alone or in combination of two or more kinds thereof.

Specific examples of the color developing agent include the following compounds: phenol, o-cresol, tertiary butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, benzyl p-hydroxybenzoate, dihydroxybenzoic acid or esters thereof such as methyl 2,3-dihydroxybenzoate and methyl 3,5-dihydroxybenzoate, resorcin, gallic acid, dodecyl gallate, ethyl gallate, butyl gallate, propyl gallate, 2,2-bis(4-hydroxyphenyl)propane, 4,4-dihydroxydiphenylsulfone, 1,1-bis(4-hydroxyphenyl)ethane, 2,2-bis(4-hydroxy-3-methylphenyl)propane, bis(4-hydroxyphenyl)sulfide, 1-phenyl-1,1-bis(4-hydroxyphenyl)ethane, 1,1-bis(4-hydroxyphenyl)-3-methylbutane, 1,1-bis(4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 2,2-bis(4-hydroxyphenyl)butane, 2,2-bis(4-hydroxyphenyl)ethyl propionate, 2,2-bis(4-hydroxyphenyl)-4-methylpentane, 2,2-bis(4-hydroxyphenyl) hexafluoropropane, 2,2-bis(4-hydroxyphenyl)-n-heptane 2,2-bis(4-hydroxyphenyl)-n-nonane, 2,4-dihydroxyacetophenone, 2,5-dihydroxyacetophenone, 2,6-dihydroxyacetophenone, 3,5-dihydroxyacetophenone, 2,3,4-trihydroxyacetophenone, 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, 2,3,4,4'-tetrahydroxybenzophenone, 2,4'-biphenol, 4,4'-biphenol, 4-[(4-hydroxyphenyl)methyl]-1,2,3-benzenetriol, 4-[(3,5-dimethyl-4-hydroxyphenyl)methyl]-1,2,3-benzenetriol, 4,6-bis[(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)bis(1,2-benzenediol)], 4,4',4''-ethylidenetrisphenol, 4,4'-(1-methylethylidene) bisphenol, and methylenetris-p-cresol.

The content of the color developing agent is preferably from 0.5 to 10.0 wt % of the total amount of the decolorizable water-based inkjet ink. The content of the color developing agent is more preferably from 0.5 to 5.0 wt % of the total amount of the decolorizable water-based inkjet ink.

Further, the content of the color developing agent is preferably 0.5 to 2.0 times as much as that of the color developable compound. When the color developable compound and the color developing agent are incorporated in the ink at such a ratio, the color developing performance is improved.

The solvent contains water and a water-soluble organic solvent. As the water, for example, pure water can be used. The content of water in the solvent is preferably 20 wt % or more. The content of water is more preferably from 20 to 90 wt %, particularly preferably from 20 to 80 wt % of the solvent.

The water-soluble organic solvent prevents the ink from drying. In order to obtain a desired effect, the content of the water-soluble organic solvent is preferably set to 10 wt % or more of the total amount of the solvent. The content of the water-soluble organic solvent is more preferably from 10 to 50 wt %, particularly preferably from 15 to 35 wt % of the solvent.

Examples of the water-soluble organic solvent include polyhydric alcohols such as ethylene glycol, diethylene glycol, triethylene glycol, polyethylene glycol, polypropylene glycol, 1,5-pentanediol, 1,6-hexanediol, glycerine, 1,2,6-hexanetriol, and petriol. The polyhydric alcohols may be used alone or in combination of two or more kinds thereof. Further, a monohydric alcohol such as ethanol, methanol, or propanol can be used. Such a monohydric alcohol has an action of dissolving the color developable compound and the color developing agent.

The nonionic surfactant prevents curling of a paper medium as well as adjusts the surface tension of the ink. The nonionic surfactant has a higher wetting property than an anionic surfactant and a cationic surfactant, and therefore is considered to have an excellent effect of suppressing curling.

Incidentally, the paper medium as used herein generally refers to a medium made of paper to be used for printing. The paper medium is broadly divided into coated paper coated with a material for increasing print properties such as art paper or coat paper and non-coated paper to be used for utilizing the properties of paper itself. The paper medium is applied to a variety of uses such as books, documents, newspapers, packages, printer sheets, etc. For example, so-called plain paper such as copy paper to be used in a copier or a printer for office or home use is a typical paper medium.

Examples of the nonionic surfactant include polyoxyethylene alkyl ethers such as polyoxyethylene lauryl ether, polyoxyethylene stearyl ether, and polyoxyethylene myristyl ether; polyoxyalkylene alkyl ethers such as polyoxyethylene alkylene alkyl ethers and polyoxyethylene polyoxypropylene glycol; and sorbitan fatty acid esters such as sorbitan monolaurate, sorbitan monopalmitate, and sorbitan monostearate.

As the nonionic surfactant, polyoxyalkylene alkyl ethers are preferred.

The content of the nonionic surfactant is 5 wt % or more of the total amount of the solvent. If the content thereof is less than 5 wt %, curling of a paper medium cannot be sufficiently suppressed. If the nonionic surfactant is contained too much, an odor problem may arise. Further, the reduction in VOC is also inhibited. If the content of the nonionic surfactant is 50 wt % or less of the solvent, a desired effect can be obtained while avoiding such a disadvantage. The content of the nonionic surfactant is more preferably from 10 to 35 wt % of the total amount of the solvent.

The color material containing the color developable compound and the color developing agent may be encapsulated. The color material can be encapsulated by a conventional method. Examples of the method include an interfacial polymerization method, a coacervation method, an in-situ polymerization method, a submerged drying method, and a submerged curing coating method. In particular, an in-situ method in which a melamine resin is used as a shell component, an interfacial polymerization method in which a urethane resin is used as a shell component, or the like is preferred.

The size of each particle of the encapsulated color material is preferably from about 0.3 to 2.0 µm. The size of each particle of the encapsulated color material can be confirmed using a particle size analyzer (such as Coulter Particle Size Analyzer). The size of each particle of the encapsulated color material can be made to fall within a desired range by, for example, controlling the dispersibility of the color material components or the like.

By using the ink containing the encapsulated color material, the density when the color is developed can be increased. This is because the encapsulation makes the color material less susceptible to the environmental effects such as temperature, humidity, chemical substances, and so on.

In the encapsulated color material, a decolorization maintaining agent can be incorporated. The decolorization maintaining agent is a compound causing thermal hysteresis such that a temperature difference ($\Delta T$) between the melting point and the solidifying point is large. The color material containing the decolorization maintaining agent has a property as follows. That is, the color material is in a colored state at normal temperature, but is decolorized when the color material is heated to a temperature not lower than the melting point of the decolorization maintaining agent and is maintained in a decolorized state even after being returned to normal temperature in the case of having a solidifying point not higher than normal temperature.

Examples of the decolorization maintaining agent include alcohols, esters, ketones, ethers, and acid amides, and particularly preferred are esters.

Specific examples of the esters include esters of carboxylic acids containing a substituted aromatic ring, esters of carboxylic acids containing an unsubstituted aromatic ring with aliphatic alcohols, esters of carboxylic acids containing a cyclohexyl group in each molecule, esters of fatty acids with unsubstituted aromatic alcohols, esters of fatty acids with phenols, esters of fatty acids with branched aliphatic alcohols, esters of dicarboxylic acids with aromatic alcohols, and esters of dicarboxylic acids with branched aliphatic alcohols.

More specific examples of the esters include dibenzyl cinnamate, heptyl stearate, didecyl adipate, dilauryl adipate, dimyristyl adipate, dicetyl adipate, distearyl adipate, trilaurin, trimyristin, tristearin, dimyristin, and distearin.

The decolorization maintaining agents may be used alone or in combination of two or more kinds thereof.

The decolorizable water-based inkjet ink according to this embodiment can be prepared by, for example, a method as described below. First, a color developable compound and a color developing agent are melted by heating, and then, the resulting mixture is dissolved in an alcohol or the like, whereby a color material solution is obtained. This color material solution is mixed with a nonionic surfactant, water, and a water-soluble organic solvent, whereby the decolorizable water-based inkjet ink according to this embodiment can be obtained.

In order to obtain the encapsulated color material, a color developable compound and a color developing agent are melted by heating along with a decolorization maintaining agent, and then, the resulting mixture may be encapsulated by a conventional method. The thus obtained encapsulated color material is mixed with a nonionic surfactant, water, and a water-soluble solvent, whereby the decolorizable water-based inkjet ink according to this embodiment can be obtained.

When the decolorizable water-based inkjet ink according to this embodiment is ejected onto a paper medium and the solvent evaporates, the color developable compound and the color developing agent are bound to each other to develop a color, whereby an image is formed. Incidentally, when the encapsulated color material is used, the ink is in a colored state at an initial stage. After the color is developed, when the paper medium is heated to a given decolorization temperature or higher, the color developable compound and the color developing agent are separated from each other to decolorize the ink, whereby the image is decolorized.

An inkjet recording apparatus to be used for recording on a paper medium with such a decolorizable water-based inkjet ink according to this embodiment should be designed such that a temperature not lower than the decolorization temperature is not applied to the ink during the recording process.

When the temperature in the inkjet recording apparatus is raised to a temperature higher than the decolorization temperature of the ink, there is a possibility that the ink is decolorized before the ink is ejected onto a paper medium. In such a case, a normal image is not formed on the paper medium. Further, in consideration of energy consumption of the inkjet recording apparatus per se, the decolorization temperature of the ink is preferably set to as low as possible. Therefore, the inkjet recording apparatus is required to have a structure such that a temperature applied to the ink is prevented from rising as much as possible in the apparatus.

FIG. 1 shows a structure of an inkjet recording apparatus to be used in this embodiment.

An inkjet recording apparatus 1D shown in FIG. 1 is provided with a reuse paper cassette 10R, a new paper cassette 10N, a recording section 12D, a paper discharge tray 14, and the like. The reuse paper cassette 10R contains reuse paper P, and the new paper cassette 10N contains new paper P'. The reuse paper refers to paper on which an image was formed using the decolorizable water-based inkjet ink according to this embodiment, and the image is not decolorized yet.

In the recording section 12D, the decolorizable water-based inkjet ink according to this embodiment is ejected from an inkjet head to form an image on paper. The recording section 12D is provided with a pickup roller 102N, a conveying roller pair 103N, a pickup roller 102R, a conveying roller pair 103R, a decolorizing mechanism 151, a resist roller pair 104, a driven roller 105, a driving roller 106, a conveying belt 107, a pressing roller 108, an inkjet head 109, a conveying roller pair 110, and the like.

In the recording section 12D, the decolorizing mechanism 151 which decolorizes the image on the paper to be reused is provided. The paper discharge tray 14 holds paper on which an image was recorded by the recording section 12D.

The pickup roller 102N picks up new paper P' in the new paper cassette 10N one by one. The picked up new paper P' is conveyed to the conveying roller pair 103N and the resist roller pair 104.

The pickup roller 102R picks up reuse paper P in the reuse paper cassette 10R one by one. The picked up reuse paper P is conveyed to the conveying roller pair 103R and the resist roller pair 104. Before being conveyed to the resist roller pair 104, the reuse paper P is passed through the decolorizing mechanism 151 to erase the record, which will be described later.

The resist roller pair 104 conveys the picked up paper on the conveying belt 107 at a given timing. The conveying belt 107 is tensioned by the driving roller 106 and the driven roller 105 and is driven along with the rotation of the driving roller 106. The pressing roller 108 presses the conveyed paper against the conveying belt 107.

The conveying belt 107 has holes at predetermined intervals on a surface thereof. In the inside of the conveying belt 107, a negative pressure chamber (not shown) connected to a fan (not shown) for adsorbing the conveyed paper to the conveying belt 107 is provided. The paper P' or P is conveyed while being adsorbed to the conveying belt 107.

From the inkjet head 109, the decolorizable water-based inkjet ink according to this embodiment is ejected. As described above, the inkjet recording apparatus 1D should be designed such that a temperature not lower than the decolorization temperature of the ink is not applied to the ink in this recording apparatus. As the inkjet head 109, it is preferred to use a piezoelectric-type printing head. Further, in the head section, a radiator plate (not shown) may be provided.

In the inkjet recording apparatus as shown in the drawing, a piezoelectric-type printing head provided with a radiator plate is assumed to be used. For example, when the material is designed such that the decolorization temperature of the ink is 70° C., the inkjet recording apparatus is designed such that the temperature of the ink in the head and the like does not reach 60° C. or higher without fail. Such an apparatus can be more easily realized by providing a radiator plate or the like to the piezoelectric-type printing head.

From the inkjet head 109, the decolorizable water-based inkjet ink according to this embodiment can be ejected by selecting an ejection amount according to the conveyed paper. In the case of reuse paper P, it is preferred that the ink is ejected in an amount smaller than that in the case of new paper P', the reason for which is as follows.

An image formed on a paper medium using the decolorizable water-based inkjet ink according to this embodiment can be decolorized by heating. On the paper medium on which the image was decolorized, recording is performed again using the ink according to this embodiment. It was found that when the second recording was performed under the same conditions as the first recording, the image density in the second recording was higher than that in the first recording. The present inventors presumed the reason therefor was that the color developing agent in the ink remains in the paper. If the ink is ejected in the second recording in an amount smaller than that in the first recording, the effect of the color developing agent remaining in the paper can be reduced. By decreasing the ink ejection amount in the second recording as compared with that in the first recording as described above, an image having a density substantially the same as that in the first recording can be formed also in the second recording.

For example, by decreasing the volume of one liquid droplet ejected from a nozzle by changing the driving voltage applied to the inkjet head, the ink ejection amount in the second recording can be made smaller than that in the first recording. For example, if the volume per liquid droplet ejected in the second recording is from about 70% to 90% of the volume of one liquid droplet ejected in the first recording, a desired effect can be obtained.

If the third recording is performed, it is not necessary to make the ink ejection amount smaller than that in the second recording. The same shall apply to the fourth recording and thereafter.

In the inkjet recording apparatus 1D having the reuse paper cassette 10R and the new paper cassette 10N, a user can select paper on which an image is to be formed through an operation panel (not shown). For example, in the inkjet recording apparatus 1D, the user can select reuse paper when recording is performed for the purpose of correcting a draft, and can select new paper when recording is performed for an important document. In this manner, in the inkjet recording apparatus 1D, recording paper is selected according to the need of the user.

When the user selects new paper as the recording paper, the pickup roller 102N picks up new paper P' from the new paper cassette 10N. The conveying roller pair 103N conveys the new paper picked up by the pickup roller 102N to the resist roller pair 104 passing through the decolorizing mechanism 151. Since the paper is new, an image decolorizing treatment is not required. Therefore, the decolorizing mechanism 151 is in an idle state, and the paper P' is passed therethrough. The resist roller pair 104 conveys the paper P' on the conveying belt 107 at a given timing. The recording section 12D records an image on the paper P' conveyed on the conveying belt 107 and discharges the paper P' on the paper discharge tray 14.

Meanwhile, when the user selects reuse paper as the recording paper (or when new paper is not selected), the pickup roller 102R picks up reuse paper P from the reuse paper cassette 10R. The conveying roller pair 103R conveys the reuse paper picked up by the pickup roller 102R to the decolorizing mechanism 151. The reuse paper P is not yet subjected to an image decolorizing treatment. Therefore, the decolorizing mechanism 151 is operated for decolorizing the image on the paper.

Specifically, the decolorizing mechanism 151 heats a heating member for heating the paper to a temperature not lower than a given decolorization temperature at which the image is decolorized. In this state, the decolorizing mechanism 151 heats the conveyed reuse paper P to a temperature not lower than the given decolorization temperature. The image on the paper P heated to a temperature not lower than the given decolorization temperature is decolorized.

Figure 2:
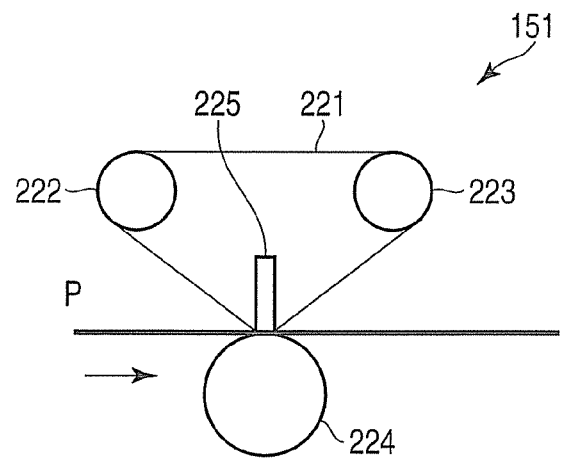
FIG. 2 is a schematic view showing an exemplary decolorizing mechanism.

One example of the decolorizing mechanism is shown in FIG. 2.

The decolorizing mechanism 151 shown in FIG. 2 is provided with a belt 221, a supporting roller 222, a supporting roller 223, a counter roller 224, a heating head 225, and the like. The belt 221 is reeved around the supporting roller 222, the supporting roller 223, and the heating head 225. The belt 221 is driven along with the rotation of the supporting rollers 222 and 223. The counter roller 224 faces the heating head 225 serving as a heat source interposing the belt 221 therebetween.

The heating head 225 presses the belt 221 against the counter roller 224. The paper P passes between the counter roller 224 and the belt 221 supported by the heating head 225. The heating head 225 is composed of a thermal head or a thermal bar. The heating head 225 can apply heat to the paper P through the belt 221 such that the temperature of the paper P reaches the decolorization temperature of the ink or higher.

That is, the heating head 225 applies heat while pressing the belt 221 against the paper P. On the paper to which heat was applied in the decolorizing mechanism 151 such that the temperature of the paper P reaches the decolorization temperature or higher, the color of the ink forming the image is erased.

The paper P on which the image was decolorized by the decolorizing mechanism 151 is conveyed to the resist roller pair 104. The resist roller pair 104 conveys the paper P subjected to the decolorizing treatment on the conveying belt 107 at a given timing. The recording section 12D records an image again on the paper P subjected to the decolorizing treatment and discharges the paper P to the paper discharge tray 14.

In the decolorizable water-based inkjet ink according to this embodiment, a water-soluble organic solvent is contained along with water, and as a surfactant, a nonionic surfactant is used. Since the ink according to this embodiment is a water-based ink, the problem of the oil-based ink does not occur. In the solvent, the water-soluble organic solvent is contained along with water, and therefore, a problem due to water is reduced. Moreover, by incorporating the nonionic surfactant, curling of a paper medium is also suppressed.

When image formation and image decolorization are repeated on the same paper medium using the decolorizable water-based inkjet ink according to this embodiment, by decreasing the ink ejection amount in the second recording as compared with that in the first recoding, it became possible to form images having substantially the same density.

Hereinafter, the decolorizable water-based inkjet ink according to the embodiment will be more specifically described with reference to Examples.

In order to obtain a decolorizable water-based inkjet ink, first, a color material solution was prepared using the following materials. As the color developable compound, crystal violet lactone (CVL, manufactured by Yamada Kagaku Co., Ltd.) was used, as the color developing agent, benzyl p-hydroxybenzoate (manufactured by Wako Pure Chemical Industries, Ltd.) was used, and as the solvent, ethanol was used.

Color developable compound: 2.5 parts by mass
Color developing agent: 2.5 parts by mass
Solvent: 30 parts by mass The color developable compound and the color developing agent were melted by heating to about 150° C. with a hot plate, and the resulting melted mixture was dissolved in ethanol, whereby a color material solution was obtained.

By using the obtained color material solution, No. 1 Ink was prepared according to the following formulation. As the water-soluble organic solvent, ethylene glycol was used.

Color material solution: 35 parts by mass
Pure water: 30 parts by mass
Water-soluble organic solvent: 25 parts by mass
Non-ionic surfactant: 10 parts by mass The used nonionic surfactant was nonionic soap Noigen XL-140 (manufactured by Dai-Ichi Kogyo Seiyaku Co., Ltd.).

No. 2 Ink was prepared in the same manner as No. 1 Ink except that the nonionic surfactant was changed to Emulgen 1118S-70 (manufactured by Kao Corporation).

An encapsulated color material was obtained using the following materials. As the color developable compound, crystal violet lactone (CVL, manufactured by Yamada Kagaku Co., Ltd.) was used. As the color developing agent, benzyl p-hydroxybenzoate (manufactured by Wako Pure Chemical Industries, Ltd.) was used, and as the decolorization maintaining agent, 4-benzyloxyphenylethyl laurate was used.

Color developable compound: 0.83 parts by mass
Color developing agent: 0.83 parts by mass
Decolorization maintaining agent: 3.3 parts by mass First, the materials were melted by heating to about 150° C. with a hot plate, and the resulting melted mixture was encapsulated by a conventional coacervation method, whereby an encapsulated color material was obtained. The size of each particle of the thus obtained encapsulated color material was confirmed to be about 1.5 μm by Coulter Particle Size Analyzer.

By using the thus prepared encapsulated color material, No. 3 Ink was prepared according to the following formulation. As the water-soluble organic solvent, ethylene glycol was used.

Encapsulated color material: 5 parts by mass
Pure water: 60 parts by mass
Water-soluble organic solvent: 25 parts by mass
Non-ionic surfactant: 10 parts by mass The used nonionic surfactant was nonionic soap Noigen XL-140 (manufactured by Dai-Ichi Kogyo Seiyaku Co., Ltd.).

No. 4 Ink was prepared in the same manner as No. 1 Ink except that ethylene glycol was not blended and the nonionic surfactant was changed to an anionic surfactant. The used anionic surfactant was Poise 520 (manufactured by Kao Corporation).

No. 5 Ink was prepared in the same manner as No. 1 Ink except that the nonionic surfactant was changed to an anionic surfactant. The used anionic surfactant was Neopelex G-25 (manufactured by Kao Corporation).

No. 6 Ink was prepared in the same manner as No. 1 Ink except that ethylene glycol was not blended and the nonionic surfactant was changed to an anionic surfactant. The used anionic surfactant was Latemul ASK (manufactured by Kao Corporation).

No. 7 Ink was prepared in the same manner as No. 2 Ink except that ethylene glycol was not blended.

A solid image was formed on paper using each of No. 1 to No. 7 Inks and the density when the color was developed was examined. When the image was formed, an inkjet recording apparatus provided with a piezoelectric head CB1 (manufactured by Toshiba Tec Corporation) was used. The size of one ink droplet ejected from the head can be controlled to be in a range of 4.5 μl to 7.5 μl by changing the driving voltage applied to the head when the ink is ejected. As the paper, Mondi Color Paper (90 g/m$^2$) was used.

The density when the color was developed was measured using a blue filter of a Macbeth densitometer and evaluated based on the following criteria according to the image density ID.

A: 0.60 or more
B: 0.45 or more but less than 0.60

The paper on which the image was formed using each of No. 1 to No. 7 Inks was passed through fixing rollers heated to 100° C., whereby the image was decolorized. The image density ID after decolorization was examined in the same manner as described above and found to be 0.10 or less in all the cases. In general, when the image density after decolorization is 0.13 or less, the image is recognized as "colorless".

Further, the curling suppression performance of each ink was examined. The paper on which the image was formed using each ink was left as such at normal temperature. After 3 days, the height of a portion of the paper where curling occurred most heavily from the horizontal plane was measured with a measure and evaluated based on the following criteria.

A: less than 1 cm
B: 1 cm or more but less than 3 cm
C: 3 cm or more

For the curling of paper, a height of less than 1 cm is required, and only an ink evaluated to be "A" is acceptable.

Further, the head clogging suppression performance of each ink was examined. Each ink was ejected from the inkjet head of the above-mentioned inkjet recording apparatus. Then, the nozzle of the inkjet head was capped and left as such for one week. Thereafter, each ink was ejected from the inkjet head again to examine the ejection performance, and the head clogging was evaluated based on the following criteria. A case where the ejection of the ink was restored by a cleaning operation twice or less was evaluated as "stable ejection".

Good: Stable ejection was achieved without performing cleaning operation.
Bad: Stable ejection was not achieved even after performing cleaning operation.

The obtained results are summarized in the following Table 1.

TABLE 1

| No. | Density when color is developed | Curling suppression performance | Head clogging suppression performance |
|---|---|---|---|
| 1 | B | A | Good |
| 2 | B | A | Good |
| 3 | A | A | Good |
| 4 | B | C | Bad |
| 5 | B | B | Good |
| 6 | B | B | Bad |
| 7 | B | A | Bad |

As shown in the above Table 1, when No. 4 to No. 6 Inks, each of which contains an anionic surfactant, are used, curling of paper cannot be suppressed. When No. 4, No. 6, and No. 7 Inks, each of which does not contain ethylene glycol as the water-soluble organic solvent, are used, head clogging cannot be suppressed.

As described above, No. 4 to No. 7 Inks cannot achieve both paper curling suppression performance and head clogging suppression performance.

In each of No. 1 to No. 3 Inks, a water-soluble organic solvent is contained in the solvent and also a nonionic surfactant is contained as a surfactant. Since all such requirements are satisfied, a decolorizable water-based inkjet ink which can suppress curling of paper to less than 1 cm and does not cause head clogging could be obtained.

Subsequently, a solid image was formed on paper by ejecting No. 3 Ink from an inkjet head (first recording), and the image density was examined. The recording apparatus and the paper used were the same as described above. The solid image by the first recording was decolorized in the same manner as described above and a solid image was formed on this paper (second recording). The image density was examined, and then, the image was decolorized in the same manner as described above. Thereafter, a solid image was formed on this paper (third recording), and the image density was examined.

The image density and the ink ejection amount are summarized in the following Tables 2 and 3.

TABLE 2

|  | 1st recording | 2nd recording | 3rd recording |
|---|---|---|---|
| Ejection amount (pl) | 6.0 | 6.0 | 6.0 |
| Image density | 0.62 | 0.75 | 0.78 |

TABLE 3

|  | 1st recording | 2nd recording | 3rd recording |
|---|---|---|---|
| Ejection amount (pl) | 6.0 | 5.0 | 5.0 |
| Image density | 0.65 | 0.62 | 0.60 |

As shown in Table 2, it is found that when the ink ejection amount is the same, the image density is increased as the number of times of repeating the image formation is increased. The image densities can be considered to be substantially the same if the difference in the image density is within ±10%. It is found from Table 3 that by decreasing the amount of the ink to be ejected in the second recording as compared with that in the first recording, substantially the same image density can be obtained.

The decolorizable water-based inkjet ink according to this embodiment dries at an adequate rate and can form an image on a paper medium without causing curling.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A decolorizable water-based inkjet ink comprising: a color material comprising a color developable compound and a color developing agent; a solvent containing water and a water-soluble organic solvent; and a nonionic surfactant which is contained in an amount of from 10 to 35 wt % of a total amount of the solvent, the color developable compound and the color developing agent being bound to each other to develop a color, and being decolorized by heat.

2. The ink according to claim 1, wherein the water-soluble organic solvent accounts for 10 to 50 wt % of the total amount of the solvent.

3. The ink according to claim 2, wherein the water-soluble organic solvent accounts for 15 to 35 wt % of the total amount of the solvent.

4. The ink according to claim 1, wherein the water-soluble organic solvent is a polyhydric alcohol.

5. The ink according to claim 4, wherein the polyhydric alcohol is selected from the group consisting of ethylene glycol, diethylene glycol, triethylene glycol, polyethylene glycol, polypropylene glycol, 1,5-pentanediol, 1,6-hexanediol, glycerine, 1,2,6-hexanetriol, and petriol.

6. The ink according to claim 1, wherein the water accounts for 20 to 90 wt % of a total amount of the solvent.

7. The ink according to claim 6, wherein the water accounts for 20 to 80 wt % of the total amount of the solvent.

8. The ink according to claim 1, wherein the nonionic surfactant is contained in an amount of 50 wt % or less of the total amount of the solvent.

9. The ink according to claim 1, wherein the nonionic surfactant is selected from the group consisting of polyoxyethylene alkyl ethers, polyoxyalkylene alkyl ethers, and sorbitan fatty acid esters.

10. The ink according to claim 1, wherein a content of the color developing agent is 0.5 to 2.0 times as much as that of the color developable compound.

11. The ink according to claim 1, wherein the color material is an encapsulated color material.

12. The ink according to claim 11, wherein the encapsulated color material further comprise a decolorization maintaining agent.

13. The ink according to claim 12, wherein the decolorization maintaining agent is selected from the group consisting of alcohols, esters, ketones, ethers, and acid amides.

* * * * *